United States Patent [19]
Folsom et al.

[11] Patent Number: 5,374,135
[45] Date of Patent: Dec. 20, 1994

[54] MOUNTING MACHINE WITH READY TRANSPORTABILITY

[75] Inventors: James C. Folsom, Sanford, Me.; John F. Drehobl, Dover, N.H.

[73] Assignee: Moore Business Forms, Inc., Grand Island, N.Y.

[21] Appl. No.: 105,386

[22] Filed: Aug. 12, 1993

[51] Int. Cl.$^5$ .............................................. F16B 2/14
[52] U.S. Cl. ................................... 403/369; 403/362; 279/53
[58] Field of Search ............... 403/362, 369, 370, 371; 279/51, 52, 53

[56] References Cited

U.S. PATENT DOCUMENTS

| | | | |
|---|---|---|---|
| 2,098,709 | 11/1937 | Murden et al. | |
| 3,618,994 | 11/1971 | Gepfert et al. | |
| 3,779,078 | 12/1973 | Kaesser et al. | |
| 3,957,381 | 5/1976 | Schäfer | 403/16 |
| 4,202,644 | 5/1980 | Soussloff | 403/369 |
| 4,345,851 | 8/1982 | Soussloff | 403/369 |
| 4,396,310 | 8/1983 | Müllenberg | 403/16 |
| 4,543,704 | 10/1985 | Soussloff | 29/458 |
| 4,557,621 | 12/1985 | Müllenberg | 403/16 |
| 4,600,334 | 7/1986 | Soussloff | 403/369 |
| 4,615,640 | 10/1986 | Hosokawa | 403/369 |

OTHER PUBLICATIONS

"Cut costs . . . not keyways. Use TRANTORQUE ®" brochure, 1981.

*Primary Examiner*—Edward K. Look
*Assistant Examiner*—Michael S. Lee
*Attorney, Agent, or Firm*—Nixon & Vanderhye

[57] ABSTRACT

A mounting device for mounting a machine element to a shaft, particularly in critical timing and high torque applications, is specifically adapted to be frequently assembled and disassembled without coming apart or in any way adversely affecting the operation of the mounting device. The mounting device includes an inner tubular element, an outer segmented tubular element, and a tubular nut. A through extending radial opening is provided in each segment of the outer element, and a circumferential groove in the outer surface of the inner element with first and second axially spaced radially extending walls. A collar (which may be the hub of a sprocket, gear, cam, pulley, roller, or other machine element) surrounds the outer element at the radial openings, and has its own radial openings through which a plurality of fasteners extend into the inner element circumferential groove, and are engageable with the radially extending walls to provide a stop for relative axial movement of the inner and outer elements with respect to each other. A disc connected to the nut allows the nut to be tightened without a wrench.

20 Claims, 3 Drawing Sheets

MOUNTING MACHINE WITH READY TRANSPORTABILITY

BACKGROUND AND SUMMARY OF THE INVENTION

A particularly advantageous mounting device for anchoring a machine element to a rotary shaft which does not cause components to wear or damage the shaft during installation, use, or removal is sold under the trademark TRANTORQUE, and is shown generally in U.S. Pat. No. 4,202, 644 (the disclosure of which is hereby incorporated by reference herein). This mounting device is particularly useful for critical timing and high torque applications. The TRANTORQUE ® mounting device includes an inner element, an outer sleeve set of segmented elements (typically three), and a nut that cooperates with them to move them relative to each other. The inner and outer elements have matching, opposite wedge tapers so that when the nut is turned the device expands and contracts, clamping onto the shaft and to an inner bore of the machine element; or the nut can be rigidly connected to the machine element.

While the TRANTORQUE ® device has a number of desirable features, in applications where it must be frequently assembled and disassembled to the shaft, it is easily unscrewed too far, and falls apart, the inner and outer elements being detached from each other, and the multiple segments of the outer element becoming disconnected. This requires substantial time in reassembly, and occasions the possibility that some of the segments will be misplaced, and therefore, is desirably avoided. According to the present invention, this problem is avoided while still having no adverse affect on the mounting device. The invention is utilizable with almost any type of machine element, such as a gear, cam, pulley, roller, or the like.

According to one aspect of the present invention a mounting device for mounting a machine element on a shaft is provided which comprises the following conventional TRANTORQUE ® elements: An inner generally tubular element having a through extending internal bore, and two distinct external portions, an externally screw threaded first portion, and a tapered wedge second portion, and at least one axially extending slot. An outer generally tubular element formed by a plurality of segments, the segments when assembled together defining a through extending internal bore having a tapered wedge configuration matching and opposite to the tapered wedge second portion of the inner element, and an outer surface, the outer surface having a circumferential groove formed therein. And a generally tubular nut element having a through extending internal bore with a first portion of the bore having internal screw threading corresponding to and mating with the external screw threaded first portion of the inner element, and having a second portion comprising a flange cooperating with the groove in the outer element. According to the present invention, the mounting device further comprises: Means for holding the inner and outer elements together so that the matching and opposite tapered wedge portions thereof may move with respect to each other to allow attachment to and release from a shaft extending through the internal bores of all of the elements, but not allowing relative movement between the inner and outer elements so that they detach from each other and the segments of the outer element become disassembled.

The holding means of the invention preferably comprises a through extending radial opening in each of the segments of the outer element, and a circumferential groove in the outer surface of the inner element with first and second axially spaced radially extending walls. A collar (e.g. of aluminum) surrounds the outer element at the radial openings, and the collar preferably has its own radial openings aligned with the radial openings in the outer element. A plurality of fasteners extend through the collar radial openings and the outer element radial openings into the inner element circumferential groove and are engageable with the radially extending walls of the inner element circumferential groove to provide a stop for the relative axial movement of the inner and outer elements with respect to each other.

The collar radial openings may be screw threaded, and the fasteners comprise screw threaded fasteners for cooperating with the screw threaded radial openings of the collar. The radially extending walls of the inner element circumferential groove may be spaced apart a distance of about 0.5–0.7 inches (e.g. 0.61 inches) to allow relative axial movement of the inner and outer elements with respect to each other a distance equal to the spacing minus the width (e.g. diameter) of one of the fasteners (e.g. about 0.2 inches).

Also optionally there is provided a radially extending flange rigidly and permanently connected to the nut element, and having a plurality of through extending openings therein parallel to the internal bore. A plurality of fasteners pass through these openings in the flange for connecting the flange to a disk which incorporates a handle that facilitates greater leverage and torque to be applied to the nut for securing the mounting element to the machine element and the shaft. The external flange (if provided) and the nut may be of steel (and welded together), and the collar may be of aluminum and have a recess for seating the external flange therein.

The collar or machine element may have a hub which is where the plurality of screws are secured. Each of the screws go through the outer element pieces to the groove of the inner element. The collar also may have a first portion on which the radial extending openings are provided, having a first relatively small diameter, and a second portion adjacent the machine element and having a second diameter approximately equal to the diameter of the machine element, and significantly greater than the first diameter. An adaptor element may also be provided surrounding the collar and releasably connected to the collar by at least one radially extending fastener. The number of segments of the outer element may comprise three, and the radially extending openings in the outer element are preferably circumferentially elongated, so as to facilitate positioning of the fasteners within them.

It is a primary object of the present invention to provide enhanced functionality of an advantageous prior art mounting device for mounting a machine element to a rotary shaft, particularly in environments where the device must be frequently assembled and disassembled to the shaft, without adversely affecting operation of the device. This and other objects of the invention will become clear from an inspection of the detailed description of the invention and from the appended claims.

DETAILED DESCRIPTION OF THE DRAWINGS

Figure 1:
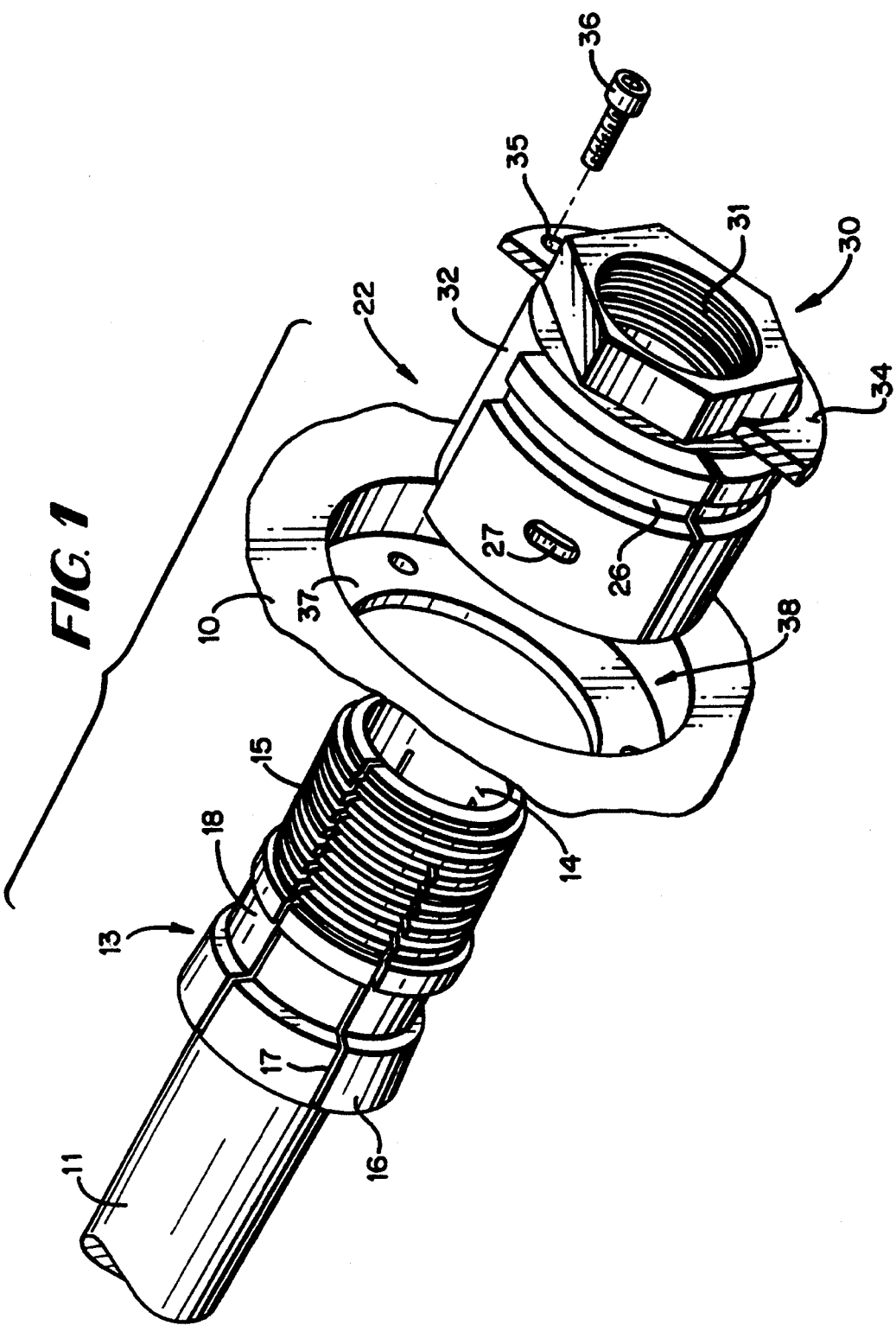
FIG. 1 is a perspective exploded view, with portions of the machine element cut away for clarity of illustration, of an exemplary mounting device according to the invention.

The mounting device according to the present invention for mounting a machine element 40 (such as a sprocket, gear, roller, cam, pulley, or the like) onto a rotary shaft 11 comprises four components. The first component, seen most clearly in FIGS. 1, 4, and 7 comprises an inner generally tubular element 13 having a through extending smooth internal bore 14 just slightly larger than the external diameter of the shaft 11. It includes two distinct external portions, a screw threaded first portion 15, and a tapered wedge second portion 16. Also, one or more axially extending slots 17 for allowing increase and decrease in the effective diameter of the element 13 to allow clamped or release relationship with respect to the shaft 11, are provided. What has been described so far with respect to the element 13 is conventional in a TRANTORQUE® element, as illustrated in U.S. Pat. No. 4,202,644.

Figure 4:
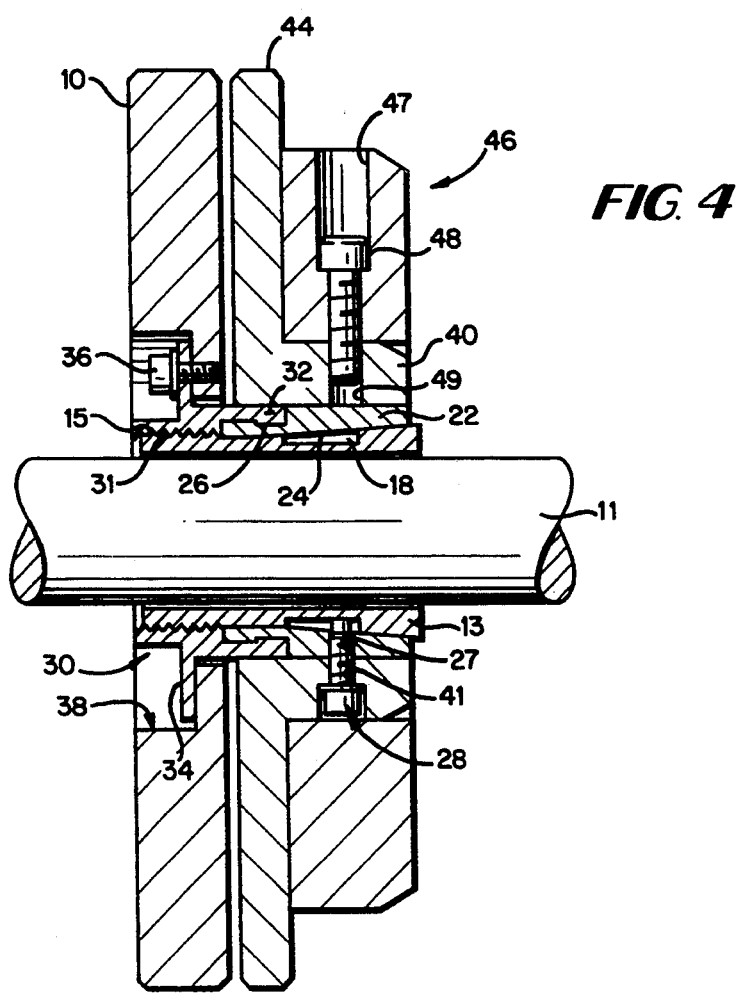
FIG. 4 is a side view, partly in cross section and partly in elevation, showing an assembled mounting device according to the invention for mounting the machine element on a shaft.
Figure 7:
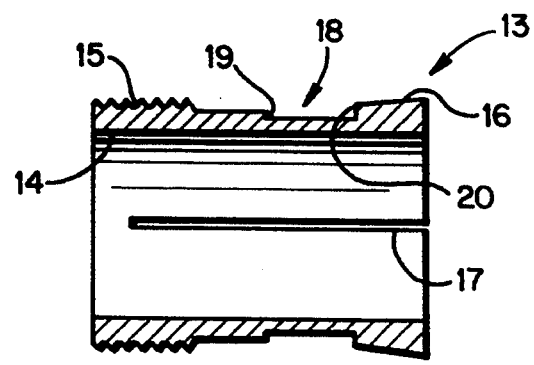
FIG. 7 is a cross-sectional view of the inner element of the device according to the present invention.

According to the present invention, the element 13 is modified so as to undercut therein a circumferential groove, shown generally by reference numeral 18 in FIGS. 1, 4, and 7. As seen in FIG. 7, the groove 18 has first and second axially spaced radially extending walls 19, 20, which define the length of travel of the element 13 with respect to the outer element as will be hereinafter described. In one exemplary embodiment in which the element 13 has a nominal internal diameter of about 1.25 inches, the length of the undercut 18—that is the spacing between the walls 19, 20—is about 0.5-0.7 inches (e.g. about 0.61 inches).

Figure 5:
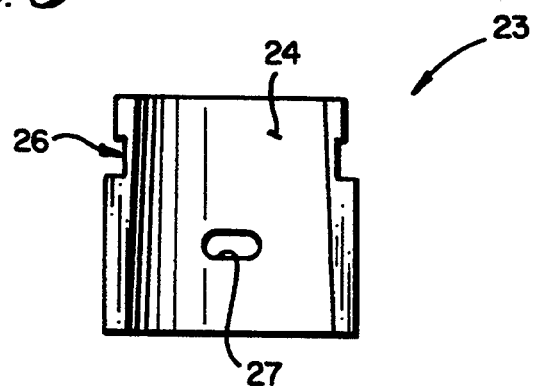
FIG. 5 is a top plan view of one of the outer element segments of the device according to the invention.
Figure 6:
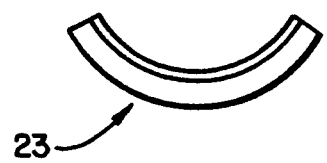
FIG. 6 is an end view of the segment of FIG. 5.

The second component of the mounting device according to the invention comprises an outer generally tubular element 22 formed by a plurality (e.g. three in the exemplary embodiment illustrated in the drawing) of segments 23, the segments 23 per se best seen in FIGS. 5 and 6, while the outer element 22 is best seen in FIGS. 1 and 4. The segments 23, when assembled together (e.g. each is 120° in arc) define a through extending internal bore 24 having a tapered wedge configuration matching and opposite to the tapered wedge configuration 16 of the inner element 13 (see FIG. 4 in particular). The outer element 22 and segments 23 when assembled together also define a circumferential groove 26 therein.

What has been described so far for each of the segments 23 is conventional in a TRANTORQUE® device, as shown in U.S. Pat. No. 4,202,644. According to the present invention, however, a radially extending opening 27 (see FIGS. 1, 4, and 6) is provided in each of the segments 23, axially spaced from the groove 26. Preferably, as illustrated in FIGS. 1 and 5, the opening 27 is circumferentially elongated so that it is longer than the width of a fastener—such as screw threaded fastener 28 (see FIGS. 2 and 4)—to extend therein, although its width need not be much greater than the diameter of the fastener 28 (e.g. the opening 27 may have a width—the axial dimension—of about 0.203 inches, and a length—the circumferential dimension—of about 0.36 inches). The face of the opening 27 is smooth since it is not in screw threaded engagement with the fastener 28 even where a screw threaded fastener 28 is utilized.

The third component of the mounting device according to the invention comprises a generally tubular nut element, shown generally by reference numeral 30 (see FIGS. 1 and 4). The nut element 30 has a through extending internal bore with a first portion of the bore having internal screw threading corresponding to and mating with the external screw threading 15 on the inner element 13. Element 30 also includes a flange portion 32 which engages the groove 26 in the segments 23 when they are assembled together. The nut 30 typically is of steel.

The nut 30 also may have an optional external flange 34 which extends radially outwardly from the nut 30 and is rigidly affixed thereto, as by welding, although it is preferred that no flange be provided. However, if a flange 34 is to be provided, the flange 34 is welded to the nut 30 and then threadably fastened to the aluminum disk 10. The flange 34 has at least one, and preferably a plurality (e.g. three) of, through extending openings 35 therein which extend parallel to the internal bore of the nut 30 and are adapted to have fasteners, such as the screw threaded fastener 36 illustrated in FIGS. 1 and 4, pass therethrough. For example, the fasteners 36 may pass into engagement with the internally screw threaded openings 37 in recess 38.

The fourth component of the mounting device according to the present invention comprises a collar or machine element, not seen in FIG. 1, but illustrated by reference numeral 40 in FIGS. 2 and 4. The collar or machine element 40 surrounds the outer element 22, and has a plurality (e.g. one associated with each segment 23) of radially extending openings 41 therein for receipt of the fasteners 28. Preferably, the openings 41 are internally screw threaded to mesh with the external screw threads on the fasteners 28. The fasteners 28 extend through the openings 41, 27, into the groove 18 in the inner element 13, and are adapted to engage the walls 19, 20 to provide a stop for the relative axial movement of the inner 13 and outer 22 elements with respect to each other.

Figure 2:
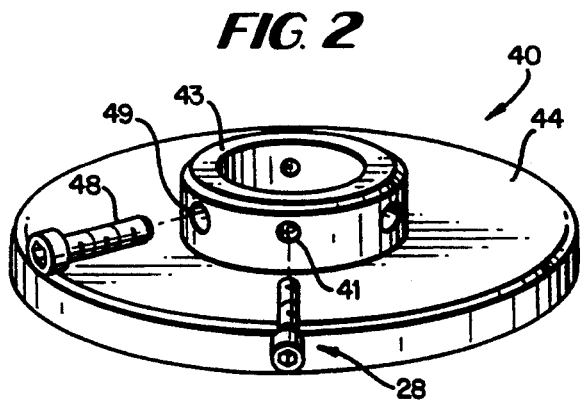
FIG. 2 is a top perspective view of the collar component of the mounting device according to the invention, utilizable with the other elements of FIG. 1.

The exact configuration of the collar or machine element 40 illustrated in FIGS. 2 and 4 is by no means critical. The collar or machine element 40 may be a single uniform diameter component. However, for the particular embodiment illustrated in FIGS. 2 and 4, the collar or machine element 40 includes a first diameter portion 43, having an internal diameter only slightly greater than the external diameter of the element 22 and having the openings 41 therein, and an integral larger diameter portion 44, preferably having the same diameter as that of the disk 10 and adapted to be substantially in face to face contact therewith as illustrated in FIG. 4. The relatively larger diameter disk 10 acts as a lever arm so as to allow the user greater leverage so that the required amount of torque can be applied to the nut 30 to tighten the TRANTORQUE ®-type device without the use of a wrench. Disk 10 may be attached to nut 30 by bolts 36 passing through openings 35.

Figure 3:
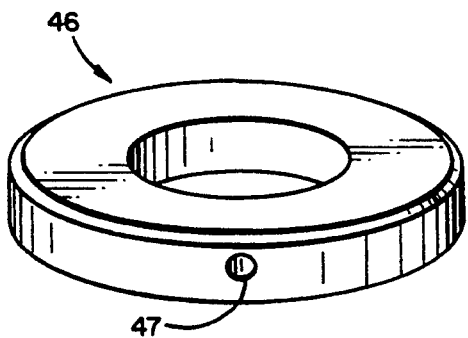
FIG. 3 is a top perspective view of an exemplary adaptor element utilizable with the other components of FIGS. 1 and 2.

Also, as an additional optional element, an adaptor 46—seen in FIGS. 3 and 4—may be provided according to the invention. The adaptor 46 is merely to provide a particular external configuration to the entire configuration of the disk 10 (which may include as components thereof the portion 44 of the collar or machine element 40 and the adaptor 46 itself), or to facilitate proper mounting of the shaft 11 at a particular location. The adaptor 46 is merely an annular shaped element which has one or more (typically only one is necessary) radially through extending bores 47, for receipt of fasteners 48 therein. Also, aligned with the bore 47 is a bore 49 in the collar or machine element 40 small diameter portion 43. As illustrated in FIGS. 3 and 4, typically the diameter of the openings 47, 49, and the diameter of the screw threaded fastener 48, are greater than the diameters of the opening 41 and fastener 28. As illustrated in FIGS. 3 and 4, the fastener 48 may engage internal screw threads in the opening 49, to hold the adaptor 46 to the collar or machine element 40.

The invention is particularly useful where it is desired to mount a steel TRANTORQUE ®-type device to a machine element or collar 40. It is desired that the collar 40 and the adaptor 46 also be of aluminum, or other lightweight though rigid material.

The apparatus according to the invention has a wide variety of uses, for example it can be used as a locking hub assembly to secure a 50" diameter roll to a shaft, for unwinding, such as in a MOORE 8600 Roll Feed Unit, available from Moore Business Forms, Inc. of Lake Forest, Ill. The collar 40 may be the hub of a sprocket, gear, cam, pulley, roller, or other machine element.

Operation of the device is heretofore described is as follows:

The collar or machine element 40 is placed around the segments 23 of the outer element 22, and the inner element 13 is inserted within the outer element 22. The nut element 30 is placed so that the flange 32 thereof is in the groove 26 in the inner element 22. Then the collar 40 is positioned around the outer element 22 so that the openings 27, 41 are aligned, and then the fasteners 28 are tightened so that the end portions thereof move into the groove 18 (see FIG. 4) of the inner element 13, though not necessarily engaging the element 13, but captivating the inner element 13. The nut element 30 is, along with the rest of the mounting device, passed over the shaft 11, and the nut element 30 is rotated in a clockwise direction, and with the internal screw threads 31 thereof engaging the external screw threads 15 of the inner element 13, to cause the inner element 13 to contract and tightly grasp the shaft 11. That is, this screw threaded action between the elements 30, 13 causes the wedge portions 16, 24 of the elements 13, 22, respectively, to move with respect with each other, causing tight clamping action of the inner element 13 on the shaft 11 as element 13 deforms due to slots 17. If desired, the adaptor 46 may be connected to the collar 40 by the fastener 48.

When it is desired to detach the machine element 40 from the shaft 11, all that is necessary is to loosen the element 30, turning it counterclockwise, as by using disk 10. This causes the wedge portions 16, 24 to move so as to loosen the shaft 11. Because the fasteners 28 slide within the circumferential groove 18 and will abut the walls 19, 20, the components 13, 22 cannot be moved with respect to each other to the extent that they completely fall apart. Therefore, the components 13, 22 and 30 will remain together upon disassembly, making reassembly much easier. The machine element/collar 40 can be disconnected from the rest of the components at any time desired by removing the fasteners 36.

It will thus be seen that according to the present invention an advantageous mounting device for mounting a machine element on a rotary shaft has been provided. While the invention has been herein shown and described in what is presently conceived to be the most practical and preferred embodiment, it will be apparent to those of ordinary skill in the art that modifications may be made thereof within the scope of the invention, which scope is to be accorded the broadest interpretation of the appended claims so as to encompass all equivalent structures and devices.

What is claimed is:

1. A mounting device for mounting a machine element on a rotary shaft, comprising:
    an inner generally tubular element having a through extending internal bore, and two distinct external portions, an externally screw threaded first portion, and a tapered wedge second portion, and at least one axially extending slot;
    an outer generally tubular element formed by a plurality of segments, said segments when assembled together defining a through extending internal bore having a tapered wedge configuration matching and opposite to said tapered wedge second portion of said inner element, and an outer surface, said outer surface having a circumferential groove formed therein;
    a generally tubular nut element having a through extending internal bore with a first portion of said bore having internal screw threading corresponding to and mating with said external screw threaded first portion of said inner element, and having a second portion comprising a flange cooperating with said groove in said outer element; and
    means for holding said inner and outer elements together so that the matching and opposite tapered wedge portions thereof may move with respect to each other to allow attachment to and release from a shaft extending through said internal bores of all of said elements, but not allowing relative movement between said inner and outer elements so that they detach from each other and said segments of said outer element become disassembled.

2. A device as recited in claim 1 wherein said holding means comprise a through extending radial opening in each of said segments of said outer element; a circumferential groove in said outer surface of said inner element with first and second axially spaced radially extending walls; a collar comprising a component of said machine element surrounding said outer element at said radial openings in said outer element, said collar having radial openings aligned with said radial openings in said outer element; and a plurality of fasteners extending through said collar radial openings and said outer element radial openings into said inner element circumferential groove and engageable with said radially extending walls of said inner element circumferential groove to provide a stop for the relative axial movement of said inner and outer elements with respect to each other.

3. A device as recited in claim 2 wherein said collar radial openings are screw threaded, and wherein said fasteners are screw threaded fasteners for cooperating with said screw threaded radial openings of said collar.

4. A device as recited in claim 3 wherein said plurality of segments of said outer element comprise three segments.

5. A device as recited in claim 3 wherein said radially extending openings in said outer element are circumferentially elongated, so as to facilitate positioning of said fasteners therein.

6. A device as recited in claim 2 wherein said radially extending walls of said inner element circumferential groove are spaced from each other a distance of about 0.5–0.7 inches to allow relative axial movement of said inner and outer elements with respect to each other a distance equal to said spacing minus the width of a said fastener.

7. A device as recited in claim 6 wherein each said fastener where it engages said radially extending walls has a diameter of about 0.2 inches.

8. A device as recited in claim 2 further comprising an adaptor element surrounding said collar and releasably connected to said collar by at least one radially extending fastener.

9. A device as recited in claim 8 wherein said collar is made of aluminum, and comprises a first portion, in which said radially extending openings are provided, having a first relatively small diameter, and a second portion adjacent a machine element, having a second diameter approximately equal to the diameter of said machine element, and significantly greater than said first diameter.

10. A device as recited in claim 2 wherein said radially extending openings in said outer element are circumferentially elongated, so as to facilitate positioning of said fasteners therein.

11. A device as recited in claim 2 further comprising a disk fixed to said nut and having a much larger diameter than said nut, thereby acting as a lever arm to allow tightening of said nut without a wrench.

12. A device as recited in claim 2 wherein said collar comprises the hub of a sprocket, gear, cam, pulley, or roller.

13. A device as recited in claim 1 wherein said plurality of segments of said outer element comprise three segments.

14. A mounting device for mounting a machine element on a rotary shaft, comprising:

an inner generally tubular element having a through extending internal bore, and two distinct external portions, an externally screw threaded first portion, and a tapered wedge second portion, and at least one axially extending slot;

an outer generally tubular element formed by a plurality of segments, said segments when assembled together defining a through extending internal bore having a tapered wedge configuration matching and opposite to said tapered wedge second portion of said inner element, and an outer surface, said outer surface having a circumferential groove formed therein;

a generally tubular nut element having a through extending internal bore with a first portion of said bore having internal screw threading corresponding to and mating with said external screw threaded first portion of said inner element, and having a second portion comprising a flange cooperating with said groove in said outer element; and a through extending radial opening in each of said segments of said outer element; a circumferential groove in said outer surface of said inner element with first and second axially spaced radially extending walls; a collar, comprising a part of a machine element, surrounding said outer element at said radial openings in said outer element, said collar having radial openings aligned with said radial openings in said outer element; and a plurality of fasteners extending through said collar radial openings and said outer element radial openings into said inner element circumferential groove and engageable with said radially extending walls of said inner element circumferential groove to provide a stop for the relative axial movement of said inner and outer elements with respect to each other.

15. A device as recited in claim 14 wherein said collar radial openings are screw threaded, and wherein said fasteners are screw threaded fasteners for cooperating with said screw threaded radial openings of said collar.

16. A device as recited in claim 14 wherein said radially extending walls of said inner element circumferential groove are spaced from each other a distance of about 0.5–0.7 inches to allow relative axial movement of said inner and outer elements with respect to each other a distance equal to said spacing minus the width of a said fastener.

17. A device as recited in claim 14 wherein said radially extending openings in said outer element are circumferentially elongated, so as to facilitate positioning of said fasteners therein.

18. A device as recited in claim 14 wherein said plurality of segments of said outer element comprise three segments.

19. A device as recited in claim 14 further comprising a disk fixed to said nut and having a much larger diameter than said nut, thereby acting as a lever arm to allow tightening of said nut without a wrench.

20. A device as recited in claim 14 wherein said collar comprises the hub of a sprocket, gear, pulley, or roller.

* * * * *